Dec. 25, 1956

N. LAING 2,775,717

SEQUENTIALLY FEEDING BRUSH HOLDER FOR
COMMUTATOR TYPE ELECTRICAL MACHINES

Filed March 7, 1955

INVENTOR:
Nikolaus LAING by

Richardson, David and Nordon

His Atty's

Dec. 25, 1956 N. LAING 2,775,717
SEQUENTIALLY FEEDING BRUSH HOLDER FOR
COMMUTATOR TYPE ELECTRICAL MACHINES
Filed March 7, 1955 2 Sheets-Sheet 2
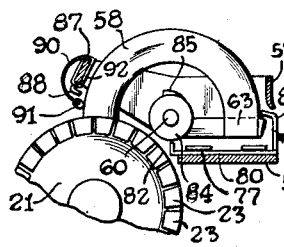
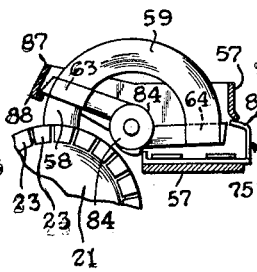
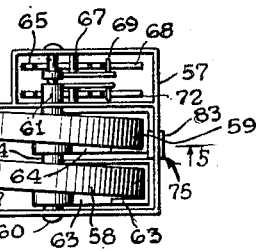
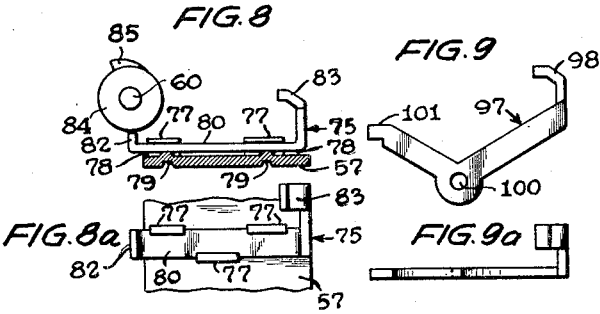
INVENTOR:
Nikolaus LAING
by
Richardson, David and Nordon
HIS ATTY'S.

United States Patent Office 2,775,717
Patented Dec. 25, 1956

2,775,717
SEQUENTIALLY FEEDING BRUSH HOLDER FOR COMMUTATOR TYPE ELECTRICAL MACHINES

Nikolaus Laing, Stuttgart, Germany

Application March 7, 1955, Serial No. 492,700

Claims priority, application Germany March 8, 1954

12 Claims. (Cl. 310—246)

The present invention relates to brush holders for use with electrical machines which employ commutators.

A principal object of the invention is to lengthen the time interval between brush replacements so that commutator type machines may advantageously be employed in situations where access to the brush holders for replacement of the brushes is difficult or inconvenient.

In cases of this character, such as motors enclosed in watertight housings, polyphase induction type motors are often used where the characteristics of direct current machines are preferable. When using conventional brush holders, the brushes require replacement frequently and to such an extent that squirrel cage induction motors are often used in spite of their limitations with respect to synchronous speed, starting torque, speed control and other characteristics. Moreover, a high speed commutator type motor will ordinarily have a much smaller frame size than an induction motor of the same output rating since the speed of the induction motor is inherently limited by the synchronous speed of its revolving field. The present invention therefore greatly widens the commercially practical field of use of commutator type machines.

Generally, the invention involves the use of a plurality of brushes in each brush holder, one or more of the brushes being held in reserve and with a single brush in active service. When the first brush in active service becomes worn down to a predetermined residual length a trip mechanism is actuated to bring the reserve brush into active service.

In one embodiment of the invention, brushes of arcuate configuration are utilized which permit a greater consumable brush length to be included within a predetermined maximum available housing diameter. Advantageously, the axes of arcuate brushes are inclined with respect to the commutator axis in a somewhat helical manner so that the active brush surface in engagement with the commutator moves axially along the commutator as the brush is progressively worn away and the formation of circumferential grooves in the commutator surface is thereby prevented.

In conjunction with the greater total consumable brush length which may be provided by a brush holder in accordance with the invention, spring operated feeding mechanism is utilized in which the contact pressure of the brush against the commutator surface does not decrease and is preferably slightly increased as the brush is progressively worn away.

The several advantageous features of the invention, such as the spring operated feeding mechanism and the arcuate brush configuration may also be embodied separately in individual and multiple brush holders without using the sequential feeding feature.

Various other objects, features and advantages of the invention will become apparent upon reading the following specification together with the accompanying drawing forming a part thereof.

Referring to the drawing:

Figure 5 is a sectional view in elevation of a modified embodiment of the invention in which arcuate brushes are utilized, Fig. 5 being a view taken on the line 5—5 of Fig. 7 looking in the direction of the arrows and prior to actuation of the tripping mechanism.

Figure 6 is a view similar to Fig. 5 showing the tripping mechanism just after its actuation and the reserve brush at the start of its active service.

Figure 7 is a plan view of the embodiment of the invention shown in Figs. 5 and 6.

Figure 8 is an enlarged sectional view in elevation showing a slidable tripping member prior to actuation of the tripping mechanism.

Figure 8A is a plan view of the tripping member shown in Fig. 8.

Figure 9 is an enlarged detail elevational view showing a modified form of tripping member which is pivotally mounted instead of slidably mounted like the tripping member shown in Figs. 8 and 8A.

Figure 9A is a plan view of the pivotal tripping member shown in Fig. 9.

Figure 10 is an enlarged detail elevational view showing a spiral spring brush feeding mechanism at the beginning of the active service of the brush.

Figure 11 is a view similar to Fig. 10 showing the feeding mechanism at the end of the active service of the brush.

Figure 12 is an enlarged fragmentary sectional view in elevation showing a damping device for suppressing brush chatter.

Figure 13 is a view similar to Fig. 12 showing a modified form of damping device.

Figure 14 is a sectional view in elevation similar to Fig. 5, showing a modified form brush holder in which an arcuate housing member guides the brush by lateral engagement therewith.

Figure 1:
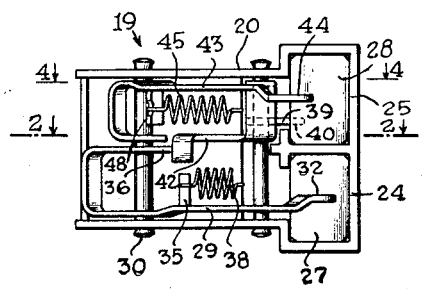
Figure 1 is a bottom plan view of a brush holder embodying the invention.
Figure 2:
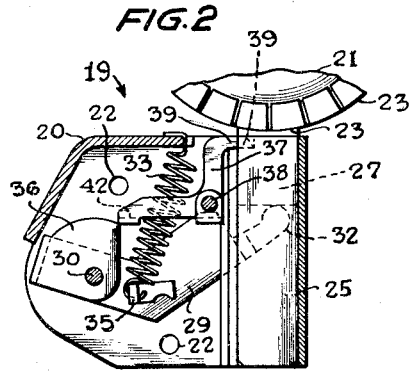
Figure 2 is a sectional view in elevation taken along the line 2—2 of Fig. 1, looking in the direction of the arrows, just prior to actuation of the trip mechanism which brings the reserve brush into active service.

Referring to Figs. 1 to 4, there is shown a brush holder designated generally as 19. Brush holder 19 comprises a body 20 which is disposed immediately below a commutator 21 of an electrical machine, only a fragment of the commutator 21 being shown in the drawing. The body 20 is provided with mounting holes 22 for securing the brush holder 19 in the machine. The commutator 21 comprises the usual commutator bars 23, which are insulated from each other.

The brush holder body 20 has brush guiding passages 24 and 25 formed therein, the passages 24 and 25 being arranged side by side axially of the commutator 21. The guiding passages 24 and 25 are open at both ends and at one side. The guiding passages 24 and 25 are both directed toward the axis of commutator 21.

Slidably disposed in guiding passages 24 and 25, respectively, are a first brush 27 and a reserve brush 28. A feeding lever 29 is pivotally mounted on a fixed shaft 30 and has a rounded free end portion 32 which engages the lower end surface of first brush 27. A helical tension spring 33 has one end anchored in a hole 34 formed in body 20. The other end of spring 33 is engaged in a notch in an integrally formed lug 35 which is punched out of feeding lever 29. The tension spring 33 thus urges the first brush feeding lever 29 to rotate in a counterclockwise direction as viewed in Figs. 2 and 3 and to press the first brush 27 into engagement with commutator 21. The first brush feeding lever 29 comprises an integrally formed arcuate sector portion 36 concentric with the axis of shaft 30 which acts as a cam surface for the release of an L-shaped retaining pawl 37. The retaining pawl 37 is pivotally mounted on a shaft 38 and is provided at its upper end with a dog 39 which engages in a slot 40 formed in the upper end of reserve brush 28. The retaining pawl 37 has a bent cam follower portion 42 which rides on sector portion 36 of feeding arm 29 until the first brush 27 has been worn away to a point where the reserve brush 28 is to be pressed into service.

Pivotally mounted on fixed shaft 30 beside the first brush feeding lever 29 is a reserve brush feeding lever 43. The reserve brush feeding lever 43 comprises a free end portion 44 which engages the lower end surface of the reserve brush 28. A helical tension spring 45 has one end anchored in a hole 47 formed in the body 20. The other end of spring 45 is engaged in a notch in an integrally formed lug 48 which is punched out of reserve brush feeding lever 43. The tension spring 45 thus urges reserve brush feeding lever 43 to rotate in a counterclockwise direction as viewed in Fig. 4 and thereby press the reserve brush 28 toward the commutator 21.

Figure 4:
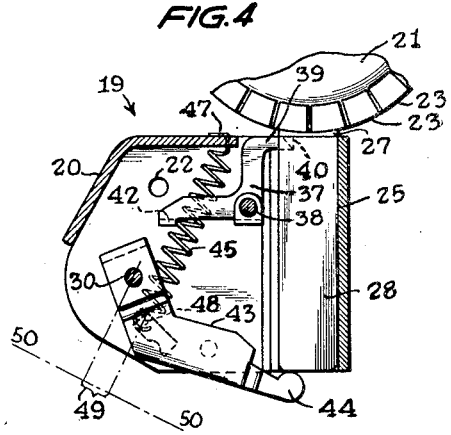
Figure 4 is a sectional view in elevation taken along the line 4—4 of Fig. 1, looking in the direction of the arrows prior to actuation of the tripping mechanism and showing the operation of the brush feeding mechanism.
Figure 3:
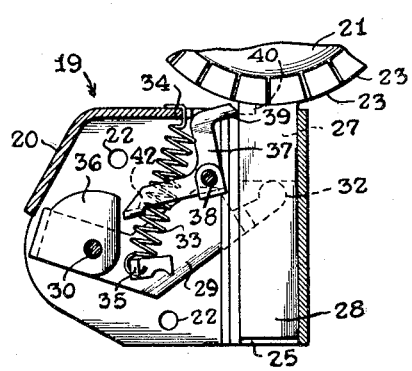
Figure 3 is a view similar to Fig. 2 showing the trip mechanism in its actuated position with the reserve brush just commensing its active service.

In operation, both brushes are initially arranged with their lower end surfaces in the position indicated in Fig. 4 for reserve brush 28. The first brush 27 is gradually consumed and its lower end surface moves upwardly under the resilient action of tension spring 33 until the brush has been partially used up leaving a residual portion as indicated in dotted lines in Fig. 2 for the first brush 27. Shortly thereafter, further wearing away of first brush 27 causes sector portion 36 of first brush feeding lever to move out of supporting engagement with the cam follower portion 42 of retaining pawl 37 as shown in Fig. 3. The spring pressed reserve brush feeding lever 43 then urges the dog 39 of retaining pawl 37 out of slot 40 in reserve brush 28 and presses reserve brush 28 into active service in engagement with commutator 21. The first brush 27 continues to be used until the first brush feeding lever 29 engages the supporting shaft 38 of retaining pawl 37. The shaft 38 acts as a stop pin and further feeding of first brush 27 is thereby prevented.

Referring to Fig. 4, it will be seen that the axis of shaft 30 is perpendicular to the longitudinal axes of brushes 27 and 28 and lies in a plane which intersects the longitudinal axes of the brushes 27 and 28 approximately midway between the initial and final positions of the lower end surfaces of the brushes. In the initial position of reserve brush 28 as shown in Fig. 4, the effective radius provided by lug 48 for turning feeding lever 43 is shortened to the length denoted by the distance 49 indicated on an imaginary projection plane 50 normal to the line of action of tension spring 45. As the brush 28 is gradually consumed, lug 48 travels in a circular path such that in the final position of feeding lever 43, a line from the axis of shaft 30 to lug 48 is substantially perpendicular to the line of action of tension spring 45 and the effective radius is the full distance from shaft 30 to lug 48. This may be seen in Fig. 3 for first brush feeding lever 29. As the force exerted on lug 48 is decreased by the gradual contraction of tension spring 45, the effective turning radius of lug 48 progressively increases. In this manner, the decreased spring tension is offset by an increased turning radius. The spring chracteristics and arm dimensions are preferably arranged to provide a somewhat increasing upward thrust on reserve brush 28 as it is progressively consumed.

Turning now to the modified embodiment of the invention shown in Figs. 5, 6 and 7, there is shown a brush holder designated generally as 55 and which comprises a body in which a first brush 58 and a reserve brush 59 are mounted. The longitudinal axis of each of the brushes 58 and 59 is curved in the form of a circular arc having its center located on the common axis of two coaxial solid and hollow shafts 60 and 61, respectively. Each of the brushes 58 and 59 is of rectangular transverse cross-sectional configuration. The circular longitudinal axis of each of the brushes 58 and 59 lies in a plane which is inclined with respect to a plane normal to the common axis of shafts 60 and 61 as may be seen in Fig. 7. This gives the brush a generally effectively helical arrangement wherein the common axis of shafts 60 and 61 constitutes the longitudinal axis of the helix. If desired, the longitudinal axes of brushes 58 and 59 may be formed as helical segments. Initially, the brushes 58 and 59 are approximately semi-circular in shape as shown in Fig. 5 and the length of arc progressively decreases to a final residual length as may be seen for first brush 58 in Fig. 6.

One end of first brush 58 engages commutator 21 and its other end is fixed to the free end of a radially extending first brush supporting arm 63 fast on the solid inner coaxial shaft 60 for rotation therewith. One end of reserve brush 59 is arranged for engagement with commutator 21 after the actuation of tripping mechanism described below and its other end is fixed to the free end of an axially extending reserve brush supporting arm 64 fast upon the hollow coaxial shaft 61.

Torque for causing brush feeding rotation of solid shaft 60 is provided by a spiral spring 65 which is shown broken away in Fig. 7 and which is diagrammatically illustrated in Figs. 10 and 11. The inner end of spiral spring 65 is supported by a stud 67 (Fig. 7) diagrammatically shown in Figs. 10 and 11 as solid fixed supporting means. The outer free end 68 of spiral spring 65 is extended substantially radially with respect to the center of the spiral. The free end 68 of spring 65 slidingly engages one side of a stud 69 carried by a first brush feeding arm 70 near its outer end. The inner end of feeding arm 70 is fast on the inner solid concentric shaft 60 for imparting brush feeding torque thereto. During the course of brush feeding operation, the lateral force applied to pin 69 by spring end portion 68 tends to decrease due to the unwinding of spring 65 by one-half a turn in the course of its movement from the initial position shown in Fig. 10 to the final position shown in Fig. 11. The center of moment or torque of the spiral spring 65, however, is horizontally displaced from the rotational axis of solid shaft 60. As a result, during the gradual transition from the initial condition shown in Fig. 10 to the final condition shown in Fig. 11, there is relative sliding movement between the free radial end portion 68 of spring 65 and the pin 69 carried by arm 70. This sliding movement gradually changes the moment arm for the lateral force applied to pin 69 by the spring end portion 68 by inward movement toward the center of torque so that the moment arm is adjusted to compensate for the progressive loss of torque which accompanies the unwinding of spring 65 and is preferably arranged to provide overcompensation as a result of which a somewhat increasing brush contact pressure is obtained at commutator 21 as the first brush 58 is progressively consumed.

A further spiral spring 72 similar to spring 65 is arranged to supply reserve brush feeding torque to reserve brush 59 through a reserve brush feeding arm 73 fast on the hollow shaft 61. The inner end of spiral spring 65 is supported by a stud 74.

It will be observed that as each of the brushes 58 and 59 is progressively consumed, the end portion of the active brush which is in engagement with the surface of commutator 21 moves axially of the commutator by reason of the effectively helical arrangement of the brushes. In this manner, the tendency of the brushes to wear grooves in the commutator surface is reduced because the annular area of contact between the active brush and the commutator is continuously changing as the brush wears away.

The tripping mechanism for releasing the reserve brush 59 for active service after the first brush 58 has been worn down to its residual length comprises a slide member designated generally as 75. The slide member 75 is guided between spaced guide ears 77 fixed to body 57. The lower surface of slide member 75 rests on upstanding projections 78 formed by punched indentations 79 in the lower surface of body 57. Slide member 75 comprises an elongated slide portion 80 which slidably engages guide ears 77 and terminates at one end in an upwardly bent tongue portion 82. At the end opposite tongue portion 82, the slide member 75 is provided with a hook portion 83 which is laterally offset with respect to the longitudinal axis of slide portion 80. Fixed on inner solid shaft 60 is a collar 84 which carries a tripping tooth 85, the collar 84 being disposed between the first brush supporting arm 63 and the reserve brush supporting arm 64.

Initially, when the first brush 58 commences its active service, the hook portion 83 of slide member 75 holds down the outer free end of reserve brush supporting arm 63 against the feeding force supplied by the torque of spiral spring 72. At this particular time, the tripping tooth 85 is in the position shown in Figs. 5 and 8 and the commutator engaging end of the reserve brush 59 is held slightly spaced away from the surface of commutator 21. The shape of hook portion 83 is so arranged that there will be no tendency to release reserve brush 59 prematurely due to any friction reducing effects of vibration. After the first brush 58 has become consumed to a small residual portion as shown in Fig. 6, the tripping tooth 85 has previously engaged tongue portion 82 of slide member 75 and forced it toward the right as viewed in Figs. 5 and 6 so that its hook portion 83 is forced clear of the outer end of reserve brush supporting arm 64. The supporting arm 64 is thereafter free to feed reserve brush 59 under the influence of the feeding torque provided by spiral spring 72 and transmitted through hollow shaft 61.

The body 57 comprises a fixed bar portion 87 which is shown in Fig. 6 provided with an inwardly turned lip 88. After the tripping mechanism comprising tooth 85 and slide member 75 has released the reserve brush 59 for active service, the outer end of first brush supporting arm 63 engages lip 88 which terminates further feeding movement of the first brush 58.

In Figs. 5 and 12, there is shown a resilient vibration damping device which yieldingly presses against the outer surface of first brush 58 near its point of engagement with the commutator 21. The damping device comprises a curved spring member 90 formed of suitable flat strip spring material. At its free end, the spring member 90 carries a pad 91. The other end 92 of spring member 90 is bent around the fixed bar portion 87 of body 57 so that spring member 90 is solidly mounted thereon. Curved spring member 90 is arranged to press pad 91 yieldingly into engagement with the outer surface of first brush 58 near its commutator engaging end. Preferably, the pad 91 is formed of suitable damping material, such as a silicone rubber, which is highly absorbent with respect to the energy of mechanical vibrations and which is also able to withstand oil and high temperatures. The pad 91 thus tends to prevent chattering and vibration of the first brush 58 due to irregularities in the surface of commutator 21 or other causes. As shown in Fig. 7, a similar vibration damping device is also provided for reserve brush 59.

Referring to Fig. 13, instead of a damping device which includes a curved spring member 90 as in Fig. 12, the damping device may alternatively consist of an integrally formed resilient damping member designated generally as 93. The damping member 93 is made of suitable material such as a silicone rubber and comprises an upper portion 95 secured to bar portion 87 of body 57 and a curved downwardly extending pressure applying portion 96 which engages the brush 58.

In Fig. 9, there is shown a modified form of tripping mechanism in which a pivoted lever designated generally as 97 is substituted for the slide member 75. The lever 97 comprises a hook portion 98 which releasably engages the reserve brush supporting arm 64 as described above for hook portion 83 of slide member 75. The lever 97 is provided with a hole 100 which is adapted to be mounted on a suitable fixed shaft (not shown) carried by body 57 so that lever 97 is pivoted at the center of hole 100. The lever 97 is also provided with an extending end portion 101 arranged to be engaged by the tripping tooth 85 of collar 84. As the first brush 58 nears the end of its period of active surface, tripping tooth 85 engages the under side of end portion 101 and rotates lever 97 in a clockwise direction causing releasing movement of hook portion 98 whereby the tripping mechanism is actuated.

Fig. 14 shows a modified form of the invention in which an arcuate guide member 102 is provided for each of the brushes 58 and 59. When the guide member 102 is provided, it is not necessary to secure the ends of brushes 58 and 59 to their respective supporting arms 63 and 64. In this arrangement, the outer ends of the supporting arms 63 and 64 act merely as feeding members and the brushes are guided by lateral engagement of their outer surfaces with the inner surface of the guide member 102. The arcuate shape of guide member 102 is concentric with the common axis of the shafts 60 and 61.

I have shown and described what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. A brush holder of the class described, comprising: means for supporting a first elongated brush for initial active engagement with a commutator together with at least one elongated reserve brush for subsequent engagement with said commutator after said first brush has been consumed to a predetermined residual length; resilient feeding means for each brush independently urging each of said brushes longitudinally toward active engagement with said commutator; and sequentially operative tripping means actuated by said resilient feeding means for the one of said brushes which is in active service when said active brush has been consumed to a predetermined residual length, said tripping means holding each reserve brush in an inactive position effectively out of engagement with said commutator until said actuation thereof and releasing a single reserve brush for active service sequentially in response to each such actuation.

2. A brush holder according to claim 1, wherein said brushes are rectilinearly elongated.

3. A brush holder according to claim 1, wherein said brushes are arcuately elongated.

4. A brush holder according to claim 3, wherein said brushes are disposed in a helical arrangement for causing progressive displacement axially of said commutator of the portion of any brush which is in active engagement with said commutator during the course of said active engagement.

5. A brush holder according to claim 3, further comprising a guide member having an arcuate inner surface in guiding engagement with the outer lateral surface of at least one of said brushes.

6. A brush holder according to claim 1, further comprising resilient damping means laterally engaging each brush for preventing chattering thereof.

7. A brush holder according to claim 6, wherein said damping means engages said brush near the surface of said commutator.

8. A brush holder according to claim 6, wherein said damping means comprises a damping member formed of a silicone rubber, said damping member being in engagement with said brush.

9. A brush holder according to claim 8, further comprising a spring member acting on said damping member for yieldingly urging said damping member into engagement with said brush.

10. A brush holder according to claim 1, wherein said resilient feeding means comprises compensating means for compensating for the loss of contact pressure of any brush with said commutator, which loss of contact pressure would otherwise be caused by progressive movement of said resilient feeding means.

11. A brush holder according to claim 10, wherein said brushes are arcuately elongated and in which said resilient means comprises a shaft concentric with the longitudinal axis of each brush, means connecting said brush to said shaft for feeding said brush by rotation of said shaft, a spiral spring for yieldingly urging brush feeding rotation of said shaft, and coupling means carried by said shaft for connecting said spiral spring to said shaft, and in which said compensating means comprises supporting means for said spring positioning the center of moment of said spiral spring eccentrically with respect to the rotational axis of said shaft and a radially extending member carried by said spiral spring and slidingly engaging said coupling means.

12. A brush holder according to claim 11, wherein said radially extending member consists of a radially directed free end portion of said spiral spring and in which said coupling means consists of an arm having one end portion fast upon said shaft and a pin carried by said arm outwardly of said shaft, said pin being in lateral sliding engagement with said free end portion of said spiral spring.

No references cited.